United States Patent [19]
Krebs et al.

[11] Patent Number: 5,156,141
[45] Date of Patent: Oct. 20, 1992

[54] CONNECTOR FOR COUPLING AN ENDOSCOPE TO A VIDEO CAMERA

[76] Inventors: Helmut Krebs, N. Kenneth Ave., Chicago, Ill. 60630; Jerrold Widran; Sanford L. Widran, both of 60 Estate Dr., Glencoe, Ill. 60022

[21] Appl. No.: 667,656

[22] Filed: Mar. 11, 1991

[51] Int. Cl.$^5$ .............................................. A61B 1/00
[52] U.S. Cl. ................................................... 128/4
[58] Field of Search ...................... 128/4; 285/276, 279

[56] References Cited

U.S. PATENT DOCUMENTS

| | | | |
|---|---|---|---|
| 2,499,659 | 3/1950 | Lockwood | 285/279 |
| 3,900,021 | 8/1975 | Makepeace et al. | 128/4 |
| 4,522,196 | 6/1985 | Cunningham et al. | 128/4 |
| 4,685,450 | 8/1987 | Collins et al. | 128/4 |
| 4,697,894 | 10/1987 | Takamura et al. | 128/4 X |

*Primary Examiner*—V. Millin
*Assistant Examiner*—J. Doyle
*Attorney, Agent, or Firm*—Michael G. Berkman

[57] ABSTRACT

A connector for coupling an endoscope to a video camera to facilitate an enhanced viewing of endoscope-invaded examination and surgical zones on a video monitor screen, to which the camera perceived image is transmitted. The coupler combines three axially-aligned and rigidly joined component elements including a first adapter for quickly and easily connecting and disconnecting an endoscope, and a second adapter for connection to a video camera. A joinder element is interposed between and connects the two adapters to one another. The three components of the coupling apparatus are fixed against rotation relative to one another, while the first adapter permits rotation of the endoscope with respect to the coupling apparatus and the attached camera. Fluid-tight seals are provided between the elements of the coupling apparatus and between its adapters themselves and endoscope and camera. The joinder element houses a longitudinally positionable lens or lens system for focusing images received from the endoscope, onto the focal plane of the video camera.

16 Claims, 2 Drawing Sheets

CONNECTOR FOR COUPLING AN ENDOSCOPE TO A VIDEO CAMERA

BACKGROUND AND FIELD OF THE INVENTION

The present invention relates to apparatus for coupling an endoscope to a video camera. More particularly, the invention is directed to a connector to be interposed between an investigative and/or surgical endoscope and a camera, and facilitating rotation of the endoscope and the camera relative to each other for image orientation and for selection of viewing fields.

The camera-perceived image is conveniently transmitted to a video screen for viewing by the surgeon, who may then adjust the attitude of the image as may be desirable.

Couplers for connecting endoscopes to video cameras are known in the art. Such devices have taken various physical form and have utilized different mechanical arrangements and structures. Some of the couplers have been objectionably cumbersome. Others have been unduly complex in use and operation. Still others have been found subject to leakage and have been found incapable of withstanding necessary sterilization treatment. Rapid and simple detachment of and reconnection of endoscopes to the coupler have posed problems in prior art devices. The requirement of effectively focusing images transmitted axially through the couplers has posed an additional challenge not adequately met in existing adapters. Yet other prior devices do not permit ease, ready and smooth rotational manipulation of the endoscope relative to the mechanically connected video camera. In spite of the established interest in perfecting the operational characteristics and enhancing the functional capability of structures for connecting endoscopes to video cameras, and notwithstanding the considerable time and effort expended, no completely satisfactory apparatus has been produced.

It is, therefore, a principal aim of the present invention to provide, for coupling an endoscope to a video camera, a connector which obviates many of the shortcomings and inadequacies of prior structures.

Features of the coupling device of the present invention are that it permits rapid and simple attachment of an endoscope to and separation from a video camera, and that it ensures unimpaired and smooth rotational manipulation of the endoscope while the latter is functionally connected to the video camera.

SUMMARY OF THE INVENTION

It is the goal of the present invention to provide, in a connector for coupling an endoscope to a video camera, a structure which ensures ease of relative rotation between the coupled components, provides safe immersibility in washing and disinfecting media, responds positively to definitive manipulation and faithfully transmits visual images desired in the field of view of the endoscope.

An additional object of the invention is to provide a coupler which may be quickly and easily attached to and disconnected from an endoscope.

Another feature of the connector of the invention is that it is attached to an endoscope from which the cumbersome eyepiece has been removed, thus rendering the assembly more compact and more easily manipulable.

A related feature of the coupler of the invention is that it includes a readily and simply positional lens element to ensure precise focusing of images onto the focal plane of the video camera.

An important feature of the coupler of the invention is that there are fluid-tight seals between elements of the coupler, and also between the coupler and the endoscope and the video camera, thus facilitating cleansing and sterilization of the apparatus in liquid media.

A related practical feature of the coupler assembly is that it, complete with camera, is immersible without damage, into sterilizing solutions.

In a preferred embodiment of the invention there is provided a quick-release coupling mechanism by which the connector may be detached from and reattached to an endoscope.

The connector of the invention is light in weight and is characterized by simplicity, strength, compactness, and ease of manipulation.

In using the connector of the invention, one may control and change the orientation of the endoscope with respect to the field of view and with respect to the video camera.

In the illustrated embodiment of the invention, the connector is fixedly secured to the video camera against relative rotation, but is coupled coaxially with the endoscope to permit relative rotation between the endoscope and the camera.

Other and further objects, features, and advantages of the invention will be evident upon a reading of the specifications, considered in conjunction with the drawings.

BRIEF DESCRIPTION OF THE DRAWINGS

FIG. 3 is a cross-sectional view taken substantially on the lines 3—3 of FIG. 2 and showing the adapter-carried bearing balls lockingly engaged in a circumscribing annular channel formed in the coupled endoscope; and FIG. 4 is an enlarged, exploded view indicating schematically the manner of decoupling an endoscope from the connecting adapter, in accordance with the present invention.

DETAILED DESCRIPTION OF ILLUSTRATED EMBODIMENT

The aims and objects of the present invention are achieved, in accordance with the invention, by providing, for use in conjunction with an endoscopic device, a connector assembly for coupling an endoscope to a video camera. The structure facilitates enhanced viewing of body zones invaded by the endoscope for medical examination and for conducting surgical procedures. In accordance with the practice of the invention, the images perceived are delivered to a video screen where they may be studied, and the areas more effectively viewed. The invention invokes an elongate, multi-section adapter in which the sections themselves are coaxial and are fixed against relative rotation.

A joinder element of the assembly is interposed between the two adapters, one for attachment to an endoscope and the other for connection to a video camera. The first adapter includes structures to permit rotation relative to the endoscope. The intermediate joinder element includes a focusing lens for focusing the viewed image on a focal plane of the video camera. A manually-manipulable control is provided for positioning the lens or lens combinations carried by the adapter. Fluid-tight seals are included between the several components of the adapter assembly, and between the assembly and the attached endoscope and the video camera.

In the arrangement described, the adapter assembly, with the camera attached, may be submerged in cleaning and disinfecting aqueous solutions without deleterious effect.

Figure 1:
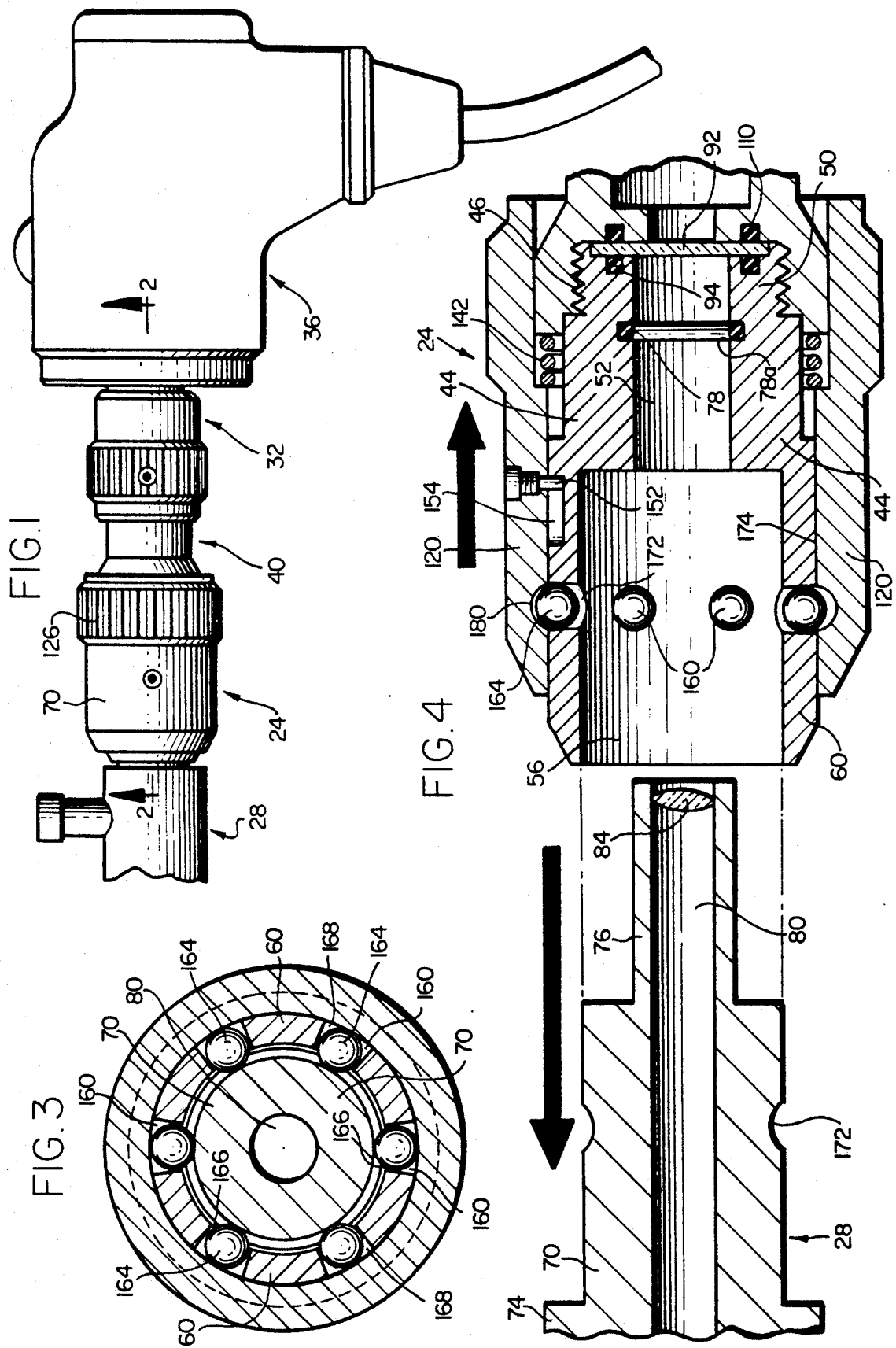
FIG. 1 is a side elevational view of the coupler assembly of the invention interposed between and connecting a video camera with an end of an endoscope.
Figure 2:
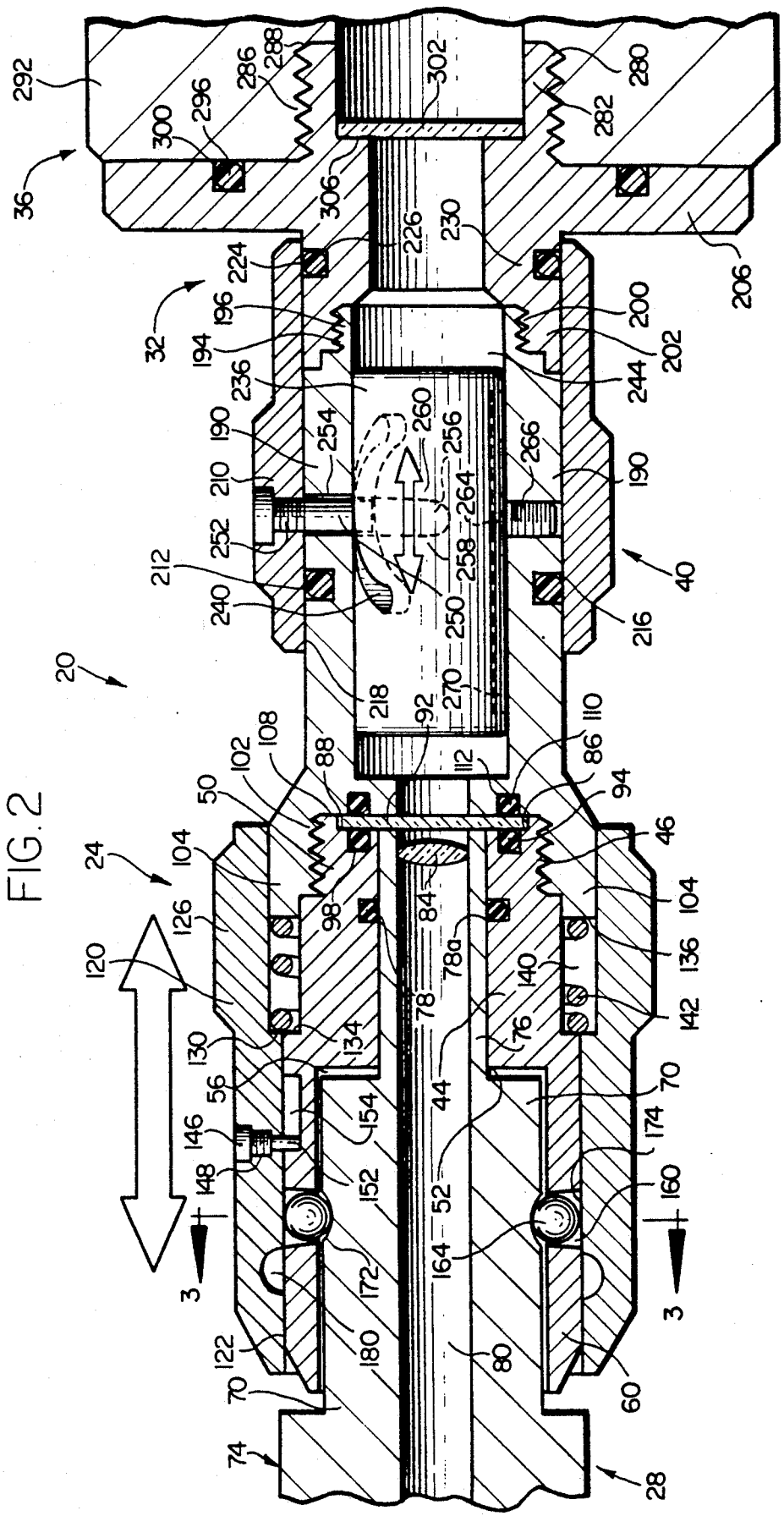
FIG. 2 is an enlarged, fragmentary, cross-sectional view taken substantially on the lines 2—2 of FIG. 1 and showing the mode of coupling and sealed securement of a video camera to an endoscope through a connecting three-element coupling assembly, according to the invention.

Referring more particularly to the drawings, and specifically to FIGS. 1, 2 and 4, for purposes of illustrative disclosure and not in any limiting sense, one preferred embodiment of the coupler apparatus 20 of the invention is shown as including a first adapter 24 for attachment to an endoscope 28, a second adapter 32 for attachment to a video camera 36, and a joinder element 40 interposed between and connecting the first adapter 24 and the second adapter 32 to one another. The three components 24, 40 and 32 of the coupler apparatus 20 are joined to one another coaxially and are fixed against rotation relative to one another.

As shown in FIGS. 2 and 4, the first adapter 24 consists of a thickened body or end portion 44, terminating in an exteriorly threaded 46 neck 50 enveloping a channel-like bore 52. Coaxial with the bore 52 and communicating therewith is a radially-enlarged generally cylindrical cavity or chamber 56 extending rearwardly of the body 44 of the first adapter 24. A generally cylindrical wall 60 bounds the cavity 56 and is contoured to receive slidably therewithin a cooperating cylindrical sector 70 of an endoscope body 74, while a radially-reduced proximal tubular end 76 of the endoscope body 74 seats coaxially and contiguously within the mating bore 52 of the adapter 24.

An O-ring 78 seated in an annular groove 78a engages the periphery of the end portion 76 of the endoscope to establish a fluid-tight seal.

Extending coaxially through the cylindrical section 70 of the coaxial end extension 76 of the endoscope 28, is a sighting bore or passage 80 of the endoscope for viewing into the cavity into which a distal end (not shown) of the endoscope 28 is positioned. Indicated schematically, a lens 84 in the passage 80 serves as one of the elements of the optical system of the endoscope 28. Seated in an annular shoulder 86 formed in an end face 88 of the neck 50 of the end portion 44 of the adapter 24 is a glass plate 92 which sealingly engages an O-ring 94 confined in an annular groove 98.

As shown in FIG. 2, the joinder element 40 is formed at its end coupled to the first adapter 24, with a threaded 102 collar 104, the threads 102 mating with cooperating threads 46 of the neck 50 of the adapter 24. As in the case of the adapter body 44, an end face 108 of the joinder element 40 abuts the glass plate 92 and is sealed thereagainst through the expedient of an O-ring 110 seated in an annular groove 112 in fluid-tight engagement.

The manner in which the endoscope body 74 is fastened to and releasably secured within the first adapter 24 is illustrated in FIGS. 2 and 4. As shown, an elongate, annular collar 120 is sleeved over, contiguously to abut an outer cylindrical face 122 of the wall 60 of the adapter 24. At its rearward zone 126, the collar is offset radially outwardly to define an interior shoulder 130 in longitudinal alignment with an exterior shoulder 134 formed on the body 44 of the adapter 24. Cutaways defining the shoulders 130 and 134 serve in conjunction with an end wall 136 of the collar 104 of the joinder element 40 to form a longitudinally-extending, annular chamber 140 which serves as a housing for a coil spring 142 confined therewithin. The spring 142 bearing on the shoulder 130 biases the collar 120 in a direction toward the endoscope, and the shoulder 134 limits the extent of spring-urged displacement of the collar 120. A pin 146 threadedly 148 secured to the collar 120 and terminating in a radially inwardly directed probe 152 invades a slot 154 formed in the collar 120 to insure positive limits of travel of the collar 120 reciprocally along the first adapter wall 60.

As shown in FIGS. 3 and 4, the wall 60 of the first adapter 24 is formed with an annular array of arcuately spaced through openings 160 disposed in a plane normal to a longitudinal axis of the cylindrical wall 60. In the particular embodiment of the invention depicted, the openings are angled toward convergence in a radially inward direction. Bearing balls 164 of a diameter greater than a thickness dimension of the wall 60 and greater than a constricted end 166 of the opening 160, but less than the flared end 168 of the openings 160, are confined in the openings 160. The large cylindrical section 70 of the endoscope body 74 is formed with an outwardly opening, circumscribing groove 172 which, in an endoscope-coupled mode of the assembly, is in longitudinal registry with the bearing balls 164. In this mode, the bearing balls 164 are engaged and forcibly directed by an inner cylindrical face 174 of the enveloping collar 120 to invade the coupling groove 172, as shown in FIG. 2, mechanically to interlock the first adapter 24 with the endoscope 28 (FIG. 2).

As indicated in FIG. 4, separation of the endoscope 28 from locked engagement with the first adapter 24 is easily and quickly effected. The reciprocally shiftable collar 120 of the adapter 24 is forcibly urged against the pressure of the captive spring 142 to shift an annular, inwardly-opening channel 180 of the adapter 24 longitudinally, away from the endoscope 28 to a position opposite and in registry with the captive bearing balls 164. This alignment renders it possible to move the bearing balls 164 radially outwardly to disengage from the groove 172 formed in the cylindrical body section 70 of the endoscope 28. The endoscope 28 can then be withdrawn endwise from the first adapter 24, in the manner depicted schematically in FIG. 4.

Referring now to FIG. 2, the joinder component 40 is shown as including a linealy-extending, barrel-like housing 190 integrally formed at one end with the threaded 102 adapter-coupling enveloping collar 104. At its opposite camera-adapter-engaging end, the joinder 40 terminates in an externally threaded 194 stub 196. The latter is secured in turn to the camera adapter 32 at a threaded 200 over-flange 202 projecting axially from a plate-like, camera-abutting body 206 of the adapter 32. The tubular housing 190 of the joinder element 40 carries an annularly-shiftable sleeve 210 coaxial with and contiguously-engaging the housing 190. An assembly which includes an O-ring 212 confined in a radially outwardly opening annular channel 216 formed in the housing 190 provides a fluid-type seal between the housing 190 and the sleeve 210. As shown in FIG. 2, in the structure described, the O-ring 212 stressingly compressed within the channel 216 abuts an inner bounding face 218 of the sleeve 210. At its opposite end 220 of the sleeve 120 there is provided a similar structure including an O-ring 224 seated in an annular groove 226 formed in that part 230 of the adapter 32 intermediate the flange 202 and the plate-like body 206.

Referring further to FIG. 2, a piston-like focusing assembly 236 is confined within the housing 190 for controlled reciprocal positioning longitudinally therewithin. The assembly 236 contains one or more lenses 240 useful as an aid in focusing visual images transmitted between the endoscope 28 and the video camera 36. In the embodiment of the invention shown, the mechanism by which the lens-carrying piston 236 is moved in the chamber 244 bounded by the housing 190 includes a control rod 250 threadedly 252 secured to the rotatable housing-enveloping sleeve 210. The housing 190 is formed with a radial slot 254 in which the rod 250 rides as the sleeve 210 is rotated arcuately about a longitudinal axis of the cylindrical chamber 244.

An end 256 of the rod 250 remote from the sleeve 210 projects into and engages within a generally horizontally-extending but pitched or angled groove 258, arcuate slot, or spiral guideway formed in the arcuate wall 260 of the piston 236. A guide pin 264 threaded 266 in the housing 190 engages the cylinder 236 within a linealy-extending guide slot 270 formed in the piston 236.

From the foregoing, it will be appreciated that upon digitally displacing the control rod 250 arcuately, the rod-engaged piston 236, being restrained against arcuate or angular movement by the guide pin 264, will respond by moving longitudinally within the confining chamber 244. The concurrent shifting of the cylinder-carried lens 240 will control image focus.

Projecting normally from the plate-like body 206 of the camera adapter 232 and coaxial with the adapter flange 202 is an exteriorly threaded 280 neck 282. The latter threadedly engages with cooperating threads 286 formed in a mounting socket 288 formed in the end block 292 of the camera 36. A fluid-tight seal between the adapter 32 and the camera 36 is provided by an O-ring 296 contained in an outwardly opening annular groove 300 formed in a camera-presented wall of the plate-like body 206 of the adapter 32. In the illustrative embodiment of the invention shown, a glass plate or panel 302 abuts and seals against the shoulder 306 formed in the camera-engaging side of the adapter 32.

What is claimed is:

1. Apparatus for connecting an endoscope to a video camera for viewing areas invaded by a tube of the endoscope, said apparatus comprising:
   an endoscope, devoid of an eyepiece,
   first adaptor means for attachment to said endoscope at a proximal end thereof in fluid-sealing engagement therewith;
   second adaptor means for attachment to a video camera in fluid-sealing engagement therewith;
   joinder means, distinct from said first and said second adaptor means and interposed, therebetween for connecting said first and said second adaptor means;
   fastener means, for securing said joinder means at each of opposed ends thereof respectively to said first adaptor means and to said second adaptor means in fluid-sealing relation therewith;
   said first adaptor means, said second adaptor means and said joinder means being in a linealy coaxial array and being fixed against rotation relative to one another;
   said first adaptor means including means for facilitating relative rotation with respect to said endoscope coaxial therewith and detachably coupled thereto.

2. The structure as set forth in claim 1 wherein said means for facilitating relative rotation between said adaptor means and said endoscope comprises bearing means carried by said first adaptor means and interposed between said first adaptor means and said endoscope;
   and wherein rotation of said endoscope is with respect to a camera attachable to said second adaptor means.

3. The structure as set forth in claim 2 wherein said bearing means comprises an array of arcuately spaced ball bearings carried by said first adaptor means as an annular array disposed about and penetrating an inner face thereof, said bearings being aligned with so as to invade a facing, outwardly opening channel formed in and circumscribing a bounding cylindrical body of said endoscope.

4. The structure as set forth in claim 1 and further comprising a threaded collar integrally formed with and projecting axially from said joinder means, said first adaptor means having a body and wherein said body of said first adaptor means includes a threaded neck for threadedly engaging with cooperating threads of said collar of said joinder means, said body of said first adaptor means including an elongate cylindrical tube defining a through axial channel-like bore of reduced diameter for receiving a proximal tubular end of said endoscope slidably therewithin.

5. Apparatus as set forth in claim 4 and further comprising a cylindrical wall of said first adaptor means, and defining a radially-enlarged, elongate cavity formed in said first adaptor means, said cavity communicating with and coaxial with said bore in said body and extending rearwardly thereof as viewed toward said joinder means, said cavity being adapted to receive slidably therewithin in substantially contiguous abutment with a radially-enlarged, lineal cylindrical sector of said endoscope in a zone adjacent the tubular end thereof.

6. The structure as set forth in claim 1 wherein said first adaptor means includes a longitudinally extending cylindrical wall, said cylindrical wall being formed with an annular array of arcuately spaced through openings, said openings delineating a plane normal to a longitudinal axis of said cylindrical wall, and ball bearings positioned in and freely rotatable in said openings in said wall, said ball bearings having diameters which are greater than a through radial thickness of said cylindrical wall in which said openings are formed.

7. The structure as set forth in claim 6 and further comprising an outwardly-opening, cooperating, circumscribing groove formed in a radially-enlarged cylindrical sector of said endoscope projecting axially into said first adaptor means, and wherein said ball bearings in said wall of said first adaptor means define an annular ring encircling and in axial correspondence with said groove, thereby establishing longitudinal registry between said openings in said wall of said first adaptor means and the endoscope-encircling groove said.

8. The structure as set forth in claim 7 and further comprising an annular collar sleeved over said cylindrical wall of said first adaptor means for limited longitudinal reciprocal travel therealong, key means for engagement with said annular wall of said first adaptor means for limiting an extent of relative reciprocal movement of said collar with respect to said first adaptor means.

9. The structure as set forth in claim 7 and further comprising a collar sleeved over said cylindrical wall of said first adaptor means, said collar being formed with an encircling annular channel opening radially outwardly thereof and displaced axially from said ball bearing receiving openings in said cylindrical wall in said first adaptor means when said collar assumes a mode in which said ball bearings are displaced radially inwardly and are urged by said collar positively to seat within a circumscribing annular groove in said endoscope and lockingly to couple said endoscope with said first adaptor means.

10. The structure as set forth in claim 9 and further comprising spring means bearing longitudinally against said collar for biasing said collar to assume a displaced mode in which said channel in said collar is out of registry with said bearing balls housed in said wall of said first adaptor means, and in which retraction of said ball bearings from the groove in the endoscope is prevented, thereby interlocking said endoscope with said first adaptor means to preclude withdrawal and separation of the endoscope from said first adaptor means.

11. The structure as set forth in claim 10 wherein said co is manually shiftable longitudinally along said first adaptor means against opposing biasing forces exerted by said spring means to effect displacement of said collar to assume a position in which said channel in said collar overlies and is in coplanar registry with said bearing balls, to allow said balls to retract into said channel in said collar as said bearing balls withdraw from the groove in said endoscope to permit longitudinal displacement of said endoscope endwise of said first adaptor means an separation of said endoscope from said first adaptor means.

12. The structure as set forth in claim 10 wherein said collar is formed at an outer boundary thereof with an outwardly opening radial slot to define a shoulder in said outer wall and to form chamber means between said collar and said first adaptor means for housing said spring means disposed therewithin, and wherein said collar is formed at an inner annular surface thereof with a cut-away section to provide a shoulder for contacting said spring means in functional engagement therewith.

13. The structure as set forth in claim 12 and further comprising key means carried by said annular collar and including probe means projecting radially therethrough for engagement within said annular wall of said first adaptor means, said annular wall being formed with groove means opening radially outwardly and extending longitudinally in said wall of said first adaptor means for receiving said probe means therein for limiting an extent of relative reciprocal longitudinal displacement of said collar with respect to said first adaptor means.

14. The structure as set forth in claim 1 wherein said joinder means includes a lineally extending, barrel-like housing, and further comprising cylindrical piston means confined in and slidable axially in said housing for controlled reciprocal positioning longitudinally therewithin, focusing means including lens means carried by said piston means for focusing images transmitted between said endoscope and a video camera operatively coupled thereto, control means for shifting said piston means longitudinally in said housing, said control means including rotatable sleeve means exterior of and coaxial with said housing, means opposing annular rotation of said piston means within said housing, said housing being formed with an arcuate slot extending radially therethrough, rod means extending through said angled groove in said housing for engaging said piston means for manually controlled shifting of said piston means and said focusing means longitudinally within said housing upon arcuate displacement of said rod means, thereby to effect focusing of images transmitted therethrough.

15. The structure as set forth in claim 14 wherein said control means includes keying means precluding annular rotation of said piston means, said keying means including a guide pin, cooperating slot means formed in said piston means for receiving said pin and opening outwardly along a lineal segment of said piston means, and further including an angled groove opening along a cylindrical surface of said piston means, said rod means being carried by said rotatable sleeve means and having an end seated to ride in said angled groove, whereby rotation of said sleeve means and arcuate displacement of said rod means carried thereby urges said piston means to shift longitudinally within said housing to effect focusing onto a focal plane of a video camera of images transmitted through said apparatus.

16. Apparatus for connecting an endoscope to a video camera for viewing areas invaded by a tube of the endoscope, said apparatus comprising:

an endoscope, devoid of an eyepiece, first adaptor means for attachment to said endoscope at a proximal end thereof in fluid-sealing engagement therewith;

second adaptor means for attachment to a video camera in fluid-sealing engagement therewith;

joinder means, distinct from said first and second adaptor means and interposed therebetween for connecting said firs and said second adaptor means;

fastener means, for securing said joinder means at each of opposed ends thereof respectively to said first adaptor means and to said second adaptor means in fluid-sealing relation therewith;

said first adaptor means, said second adaptor means and said joinder means being in a lineally coaxial array and being fixed against rotation relative to one another;

said first adaptor means including means for facilitating relative rotation with respect to said endoscope coaxial therewith and detachably coupled thereto, a threaded collar integrally formed with and projecting axially from said joinder means, said first adaptor means having a body and wherein said body of said first adaptor means includes a threaded neck for threadedly engaging with cooperating threads of said collar of said joinder means, said body of said first adaptor means including an elongate cylindrical tube defining a through axial channel-like bore of reduced diameter for receiving a proximal tubular end of said endoscope slidably therewithin, a cylindrical wall of said first adaptor means, and defining a radially-enlarged, elongate cavity formed in said first adaptor means, said cavity communicating with and coaxial with said bore in said body and extending rearwardly thereof as viewed toward said joinder means, said cavity being adapted to receive slidably therewithin in substantially contiguous abutment with a radially-enlarged, lineal, cylindrical sector of said endoscope in a zone adjacent the tubular end thereof.

* * * * *